United States Patent

Spate

[11] 3,902,772
[45] Sept. 2, 1975

[54] BEARING CAGE

[75] Inventor: Gerhard Spate, Herzogenaurach, Germany

[73] Assignee: Industriewerk Schaeffler OHG, Herzogenaurach, Germany

[22] Filed: Apr. 29, 1974

[21] Appl. No.: 464,784

[30] Foreign Application Priority Data
June 14, 1973 Germany............... 7322195[U]

[52] U.S. Cl................................ 308/217; 308/217
[51] Int. Cl.² ....................................... F16C 33/54
[58] Field of Search................... 308/217, 218, 235; 29/148.4 C, 484, DIG. 48; 113/117

[56] References Cited
UNITED STATES PATENTS

| | | | |
|---|---|---|---|
| 2,591,160 | 4/1952 | Kilian................... | 308/217 |
| 2,729,520 | 1/1956 | Ritchie et al. .................. | 308/217 X |
| 3,353,246 | 11/1967 | Farmer.......................... | 29/148.4 C |
| 3,365,775 | 1/1968 | Cavagnero et al............. | 308/217 X |
| 3,397,332 | 8/1968 | Pitner ............................ | 308/217 X |

*Primary Examiner*—M. Henson Wood, Jr.
*Assistant Examiner*—Randolph A. Reese
*Attorney, Agent, or Firm*—Hammond & Littell

[57] ABSTRACT

Novel thin walled cylindrical antifriction bearing cages comprising end rings connected by a plurality of crossbars forming roller pockets therein formed from a flat strip, one end ring being wider than the other end ring and provided in the area of the abutting edges of the cylindrical strip with at least one recess so that at least one juxtaposed surface remains for welding whose material cross-section is substantially the same as the cross-section of the narrower end ring available for welding.

4 Claims, 4 Drawing Figures

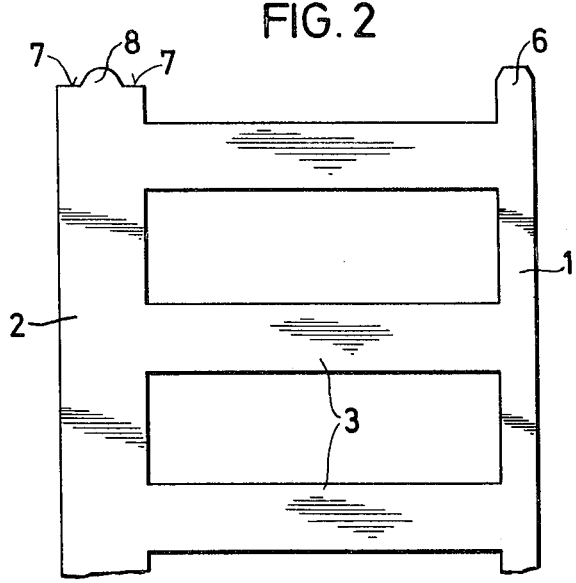
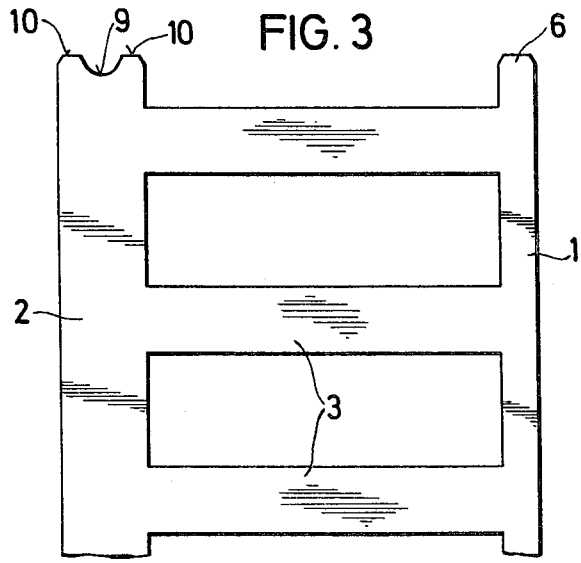

BEARING CAGE

STATE OF THE ART

Thin walled, cylindrical cages for antifriction bearings with different width end rings are known. The reason for cages of this type vary and one reason is a design in which the set of rollers is to roll eccentrically on the respective races. A wider end ring may also be selected because it has to perform additional functions such as lubrication, sealing, etc. It is not unusual in double row antifriction bearings for the central end ring between two rows of rollers to be wider than the outer two end rings. Problems arise in the manufacture of these cages during welding as the metal loss due to welding varies considerably because of the different cross-sections of the end rings which can lead to defective welds.

OBJECTS OF THE INVENTION

It is an object of the invention to provide novel bearing cages for antifriction bearings made from flat strips with perfect welds.

It is a further object of the invention to provide novel economical bearing cages which can be simply produced without the prior art disadvantages.

These and other objects and advantages of the invention will become obvious from the following detailed description.

THE INVENTION

The novel bearing cage of the invention is a thin-walled cylindrical cage comprising end rings connected by a plurality of crossbars forming roller pockets therein formed from a flat strip, one end ring being wider than the other end ring and provided in the area of the abutting edges of the cylindrical strip with at least one recess so that at least one juxtaposed surface remains for welding whose material cross-section is substantially the same as the cross-section of the narrower end ring available for welding.

The prior art problems are avoided when the wider end ring is provided at the abutting joint with one or more recesses positioned so that one or more juxtaposed surfaces remain for the welding whose cross-section is approximately equal to that of the narrower end ring for welding. This provides several surfaces with the same cross-section for welding instead of surfaces with different cross-sections for welding and therefore the melting characteristics are the same during the welding step.

In some constructions, the wider end ring may be provided in the area of the abutting surfaces with recesses on both lateral edges whereby the welding surface is formed in the center of the end ring. This welding surface will then correspond in its cross-section to the welding available cross-section on the narrower end ring. It is also possible to provide the wider end ring in the area of the abutting surfaces with a recess in its center so the welding surfaces are formed on both sides of the end ring making two welding areas available in the area of the wider end ring thereby increasing the strength in the area of these welding areas.

Referring now to the drawings:

FIG. 2 is a partial sectional view of a flat strip used to produce a cage of the invention.

FIG. 3 is a partial sectional view of a variation of the flat strip of FIG. 2

Figure 1:
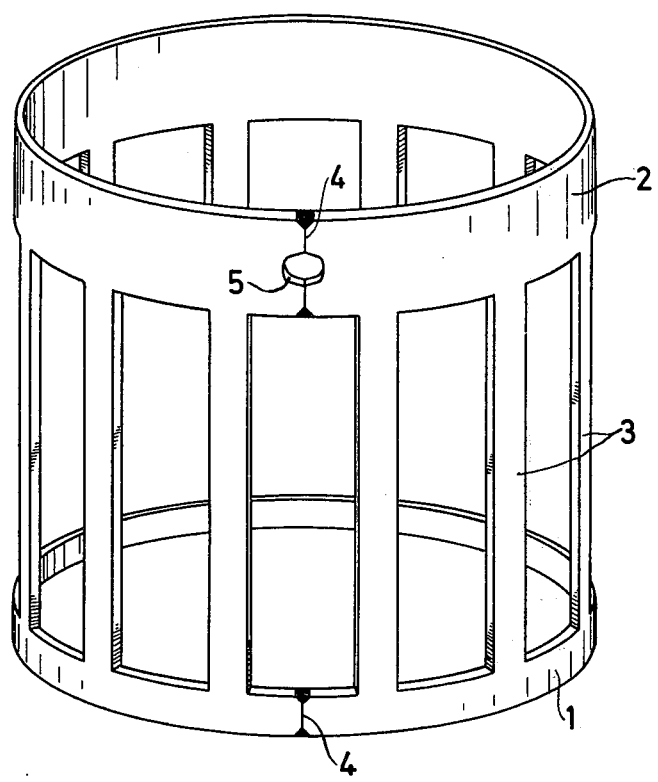
FIG. 1 is a perspective view of one embodiment of the cage of the invention.

In FIG. 1, the bearing cage is comprised of narrower end ring 1 and wider end ring 2 connected by a plurality of crossbars 3. The cage is formed from by bending a flat strip into a cylinder and welding the abutting surfaces at points 4. Wider end ring 2 is provided in the area of the abutting surfaces with recess 5 whereby the abutting surfaces are divided into 2 outer partial surfaces, each approximately corresponding in its cross-section to the abutting surfaces in narrower end ring 1.

The flat metal strip of FIG. 2 which can be used to prepare a cage of the invention is comprised of narrow end ring 1, wide end ring 2 and crossbars 3 and the end 6 of end ring 1 is substantially trapezoidal and is beveled at the corners as is usual to permit weld buildup formed to flow into the recessed corners formed when the strip is formed into a cylinder. End ring 2 is set back at its end at lateral points 7 with end part 8 remaining in the center which has a cross-section substantially equal to end 6 of end ring 1.

Figure 4:
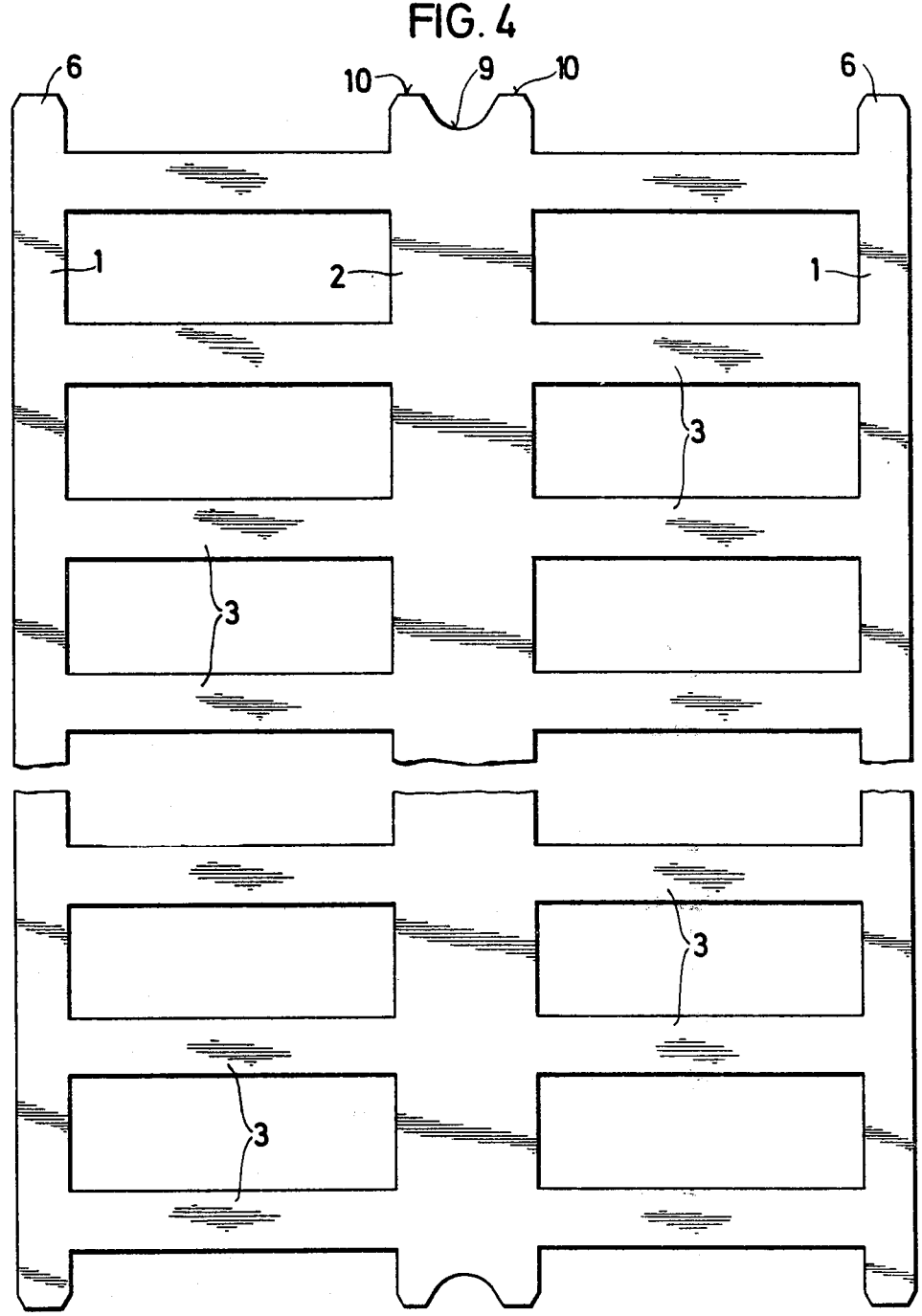
FIG. 4 is a partial sectional view of a flat strip used to produce a double row cage for an antifriction bearing.

The flat strip of FIG. 3 differs from the strip of FIG. 2 in the construction of the end of end ring 2 which is provided at its end with a central groove 9 with projecting parts 10 remaining laterally corresponding in cross-section appropriately to end 6 of end ring 1. In FIG. 4, the flat strip is to be used to produce a double row bearing cage having 2 laterally narrower end rings 1 with a wider central end ring 2 connected by a plurality of crossbars 3. Then ends 6 of the end rings 1 are designed as in FIG. 2 and the ends of central ring 2 is provided with central grooves 9 and laterally projecting parts 10 formed as in FIG. 3.

Various modifications of the bearing cages of the invention may be made without departing from the spirit or scope thereof and it should be understood that the invention is to be limited only as defined in the appended claims.

I claim:

1. A thin walled cylindrical bearing cage comprising end rings connected by a plurality of crossbars forming roller pockets therein formed from a flat strip, one end ring being wider than the other end ring and provided in the area of the abutting lateral edges of the cylindrical strip with at least one recess so that at least one juxtaposed surface remains for welding whose material cross-section is substantially the same as the cross-section of the narrower end ring available for welding.

2. The cage of claim 1 wherein the wider end ring is provided with at least one recess in the areas of the abutting lateral edges to provide a welding surface in the center of the wider end ring.

3. The cage of claim 1 wherein the wider end ring has a recess in its center in the area of the abutting edges to form welding surfaces on both sides.

4. The cage of claim 1 provided with 2 narrower end rings and a wider central end ring connected with a plurality of crossbars to form a double row bearing cage.

* * * * *